(12) United States Patent
Black et al.

(10) Patent No.: US 11,567,887 B2
(45) Date of Patent: Jan. 31, 2023

(54) QUANTUM CONTROLLER FAST PATH INTERFACE

(71) Applicant: International Business Machines Corporation, Armonk, NY (US)

(72) Inventors: Ryan Black, Minneapolis, MN (US); Todd Alan Greenfield, Rochester, MN (US); Timothy Lindquist, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 39 days.

(21) Appl. No.: 17/018,531

(22) Filed: Sep. 11, 2020

(65) Prior Publication Data

US 2022/0083488 A1 Mar. 17, 2022

(51) Int. Cl.
*G06F 13/362* (2006.01)
*G06N 10/00* (2022.01)
*G06F 1/12* (2006.01)

(52) U.S. Cl.
CPC ............ *G06F 13/3625* (2013.01); *G06F 1/12* (2013.01); *G06N 10/00* (2019.01)

(58) Field of Classification Search
CPC ........ G06F 1/12; G06F 13/3625; G06N 10/00
See application file for complete search history.

(56) References Cited

U.S. PATENT DOCUMENTS

| | | | |
|---|---|---|---|
| 9,218,567 B2 | 12/2015 | Macready et al. | |
| 9,645,604 B1 * | 5/2017 | Nebesnyi | G06F 1/12 |
| 9,876,505 B1 | 1/2018 | Dai et al. | |
| 10,505,524 B1 * | 12/2019 | Cohen | H03K 19/195 |
| 10,536,224 B1 | 1/2020 | Nation et al. | |
| 10,546,244 B2 | 1/2020 | Bishop et al. | |
| 10,552,756 B2 | 2/2020 | Ipek et al. | |
| 10,560,076 B1 | 2/2020 | Cohen et al. | |

(Continued)

FOREIGN PATENT DOCUMENTS

| | | |
|---|---|---|
| EP | 2729903 A1 | 5/2014 |
| WO | 2013/006836 A1 | 1/2013 |

(Continued)

OTHER PUBLICATIONS

International Search Report and Written Opinion received for PCT Application Serial No. PCT/EP2021/074825 dated Dec. 2, 2021, 12 pages.

(Continued)

*Primary Examiner* — Raymond N Phan
(74) *Attorney, Agent, or Firm* — Amin, Turocy & Watson, LLP

(57) ABSTRACT

Techniques regarding routing qubit data are provided. For example, one or more embodiments described herein can comprise a computer-implemented method for training a quantum controller fast path interface that can control the qubit data routing. The computer-implemented method can comprise training, by a system operatively coupled to a processor, the quantum controller fast path interface for routing qubit data bits between a quantum controller and conditional engine by adjusting a delay value such that a mesochronous clock domain is characterized by a direct register-to-register transfer pattern.

19 Claims, 10 Drawing Sheets

(56) References Cited

U.S. PATENT DOCUMENTS

| | | | |
|---|---|---|---|
| 10,635,990 | B1 | 4/2020 | Park et al. |
| 11,210,602 | B2* | 12/2021 | Biercuk ................ G06F 15/82 |
| 2013/0198740 | A1 | 8/2013 | Arroyo et al. |
| 2015/0026494 | A1 | 1/2015 | Bainbridge et al. |
| 2015/0324705 | A1 | 11/2015 | Biercuk et al. |
| 2016/0218867 | A1 | 7/2016 | Nordholt et al. |
| 2016/0328211 | A1 | 11/2016 | Nordholt et al. |
| 2017/0177534 | A1 | 6/2017 | Mohseni et al. |
| 2019/0042965 | A1 | 2/2019 | Clarke et al. |
| 2019/0042970 | A1 | 2/2019 | Zou et al. |
| 2019/0042973 | A1 | 2/2019 | Zou et al. |
| 2019/0251478 | A1 | 8/2019 | Bishop et al. |
| 2020/0116784 | A1 | 4/2020 | Liu et al. |
| 2020/0125402 | A1 | 4/2020 | Griffin et al. |
| 2020/0349458 | A1* | 11/2020 | Cohen .................... G06N 10/00 |
| 2020/0358536 | A1* | 11/2020 | Griffin .................. H04L 9/0855 |

FOREIGN PATENT DOCUMENTS

| | | | |
|---|---|---|---|
| WO | 2020056176 | A1 | 3/2020 |
| WO | 2020109869 | A2 | 6/2020 |

OTHER PUBLICATIONS

Versluis et al., "Quantum computers scale up: Constructing a universal quantum computer with a large number of qubits will be hard but not impossible", IEEE Spectrum, XP011781542, vol. 57, No. 4, Apr. 1, 2020, pp. 24-29.

Calderaro et al., "Fast and simple qubit-based synchronization for quantum key distribution", arxiv.org, Cornell University Library, 201 Olin Library Cornell University Ithaca, NY 14853, XP081483617, Sep. 26, 2019, 7 pages.

Tarjan, Paul "Online YAML Parser" http://yaml-online-parser.appspot.com/, Last Accessed Aug. 24, 2020. 1 page.

Qiskit "Development Strategy" Qiskit Development Team,. https://qiskit.org/documentation/development_strategy.html, Last Accessed Aug. 24, 2020. 9 pages.

Ben-Kiki "YPaste—Online YAML Reference Parser" ben-kiki.org/oren/2016/02/26/ypaste.html, Last Accessed Aug. 24, 2020, 1 page.

Databytzal, "Learn YAML in five minutes!" Code Project, https://www.codeproject.com/Articles/1214409/Learn-YAML-in-five-minutes, Dec. 28, 2017. 7 pages.

"YAML 1.2" https://yaml.org/, Last Accessed, Aug. 24, 2020, 3 pages.

Yehan, Liu "Quantum Feedback Control of Multiple Superconducting Qubits" Yale University, Dec. 2016, 181 pages.

Steiger et al. "ProjectQ: An Open Source Software Framework for Quantum Computing" arXiv:1612.08091v1 [quant-ph] Dec. 23, 2016, 11 pages.

Mell, Peter, et al. "The NIST Definition of Cloud Computing." National Institute of Standards and Technology. Sep. 2011. 7 pages.

Mckay et al., "Qiskit Backend Specifications for OpenQASM and OpenPulse Experiments," arXiv:1809.03452 [quant-ph, Sep. 11, 2018, 68 pages.

Alexander et al., "Qiskit Pulse: Programming Quantum Computers through the Clouds with Pulses," arXiv:2004.06755 [quant-ph], Apr. 14, 2020, 16 pages.

Mcclure, "Programming Quantum Computers with Qiskit," WiSQCE, Jan. 2020, 49 pages.

International Search Report and Written Opinion received for PCT Application Serial No. PCT/EP2021/074830 dated Jan. 14, 2022, 11 pages.

International Search Report and Written Opinion received for PCT Application Serial No. PCT/EP2021/074829 dated Dec. 22, 2021, 15 pages.

Guerreschi et al. "Two-step approach to scheduling quantum circuits", arXiv:1708.00023v2 [quant-ph], XP081150149, May 16, 2018, 25 pages.

List of IBM Patent Applications Treated as Related.

* cited by examiner

QUANTUM CONTROLLER FAST PATH INTERFACE

BACKGROUND

The subject disclosure relates to a quantum controller fast path interface, and more specifically, to routing qubit information between one or more quantum controllers and conditional engines via a quantum controller fast path interface that is characterized by a direct register-to-register transfer pattern.

In quantum computing systems, it has been considered favorable to develop hardware paths for routing qubit information to controllers of other qubits in a given network of qubits, preferably as quickly as possible. This communication of qubit data to other qubit controllers would allow for efficient conditional operations to be applied on those qubits. This has various potential applications in the quantum computing world, including but not limited to topics such as forcing qubits to known states and qubit teleportation. However, typical implementations of qubit data routing interfaces employ asynchronous boundaries and extra header information to qualify the qubit data, which can be detrimental to system operation since the qubits continuously degrade while the data transfer occurs.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products for routing qubit data are described.

According to an embodiment, a computer-implemented method is provided. The computer-implemented method can comprise training, by a system operatively coupled to a processor, a quantum controller fast path interface for routing qubit data bits between a quantum controller and conditional engine by adjusting a delay value such that a mesochronous clock domain is characterized by a direct register-to-register transfer pattern. An advantage of such a computer-implemented method can be training the interface to reduce data transfer latency.

In some examples, the computer-implemented method can further comprise selecting, by the system, the delay value that can stabilize the mesochronous clock domain by shifting a delay device of the quantum controller fast path interface. An advantage of such a computer-implemented method can be that embedded conditional can be employed to train the interface rather than relying on hardware components.

According to an embodiment, a computer program product for routing qubit data bits between a quantum controller and a conditional engine is provided. The computer program product can comprise a computer readable storage medium having program instructions embodied therewith. The program instructions executable by a processor to cause the processor to train, by the processor, a quantum controller fast path interface by adjusting a delay value such that a mesochronous clock domain of the quantum controller fast path interface is characterized by a direct register-to-register transfer pattern.

In some examples, the computer program product can further cause the processor to assess, by the processor, a stability of the mesochronous clock domain at the delay value with regards to a target wire of the quantum controller fast path interface. An advantage of such a computer program product can be that the quantum data bits can be centered from the domain edges so as to be positioned outside the setup-and-hold time window.

According to an embodiment, a system is provided. The system can comprise a quantum controller fast path interface that can route a qubit data packet between a quantum controller and a conditional engine via a packet transfer protocol in which sender information is inferred from data position within the qubit data packet. An advantage of such a system can be that qubit data traffic can be routed with low latency so as to account for qubit degradation.

In some examples of the system, the qubit data packet can consist of a pairing of the data position and a qubit valid. An advantage of such a system can be that a data packet can be employed that does not necessitate overhead information to qualify the qubit data.

DETAILED DESCRIPTION

Figure 1:
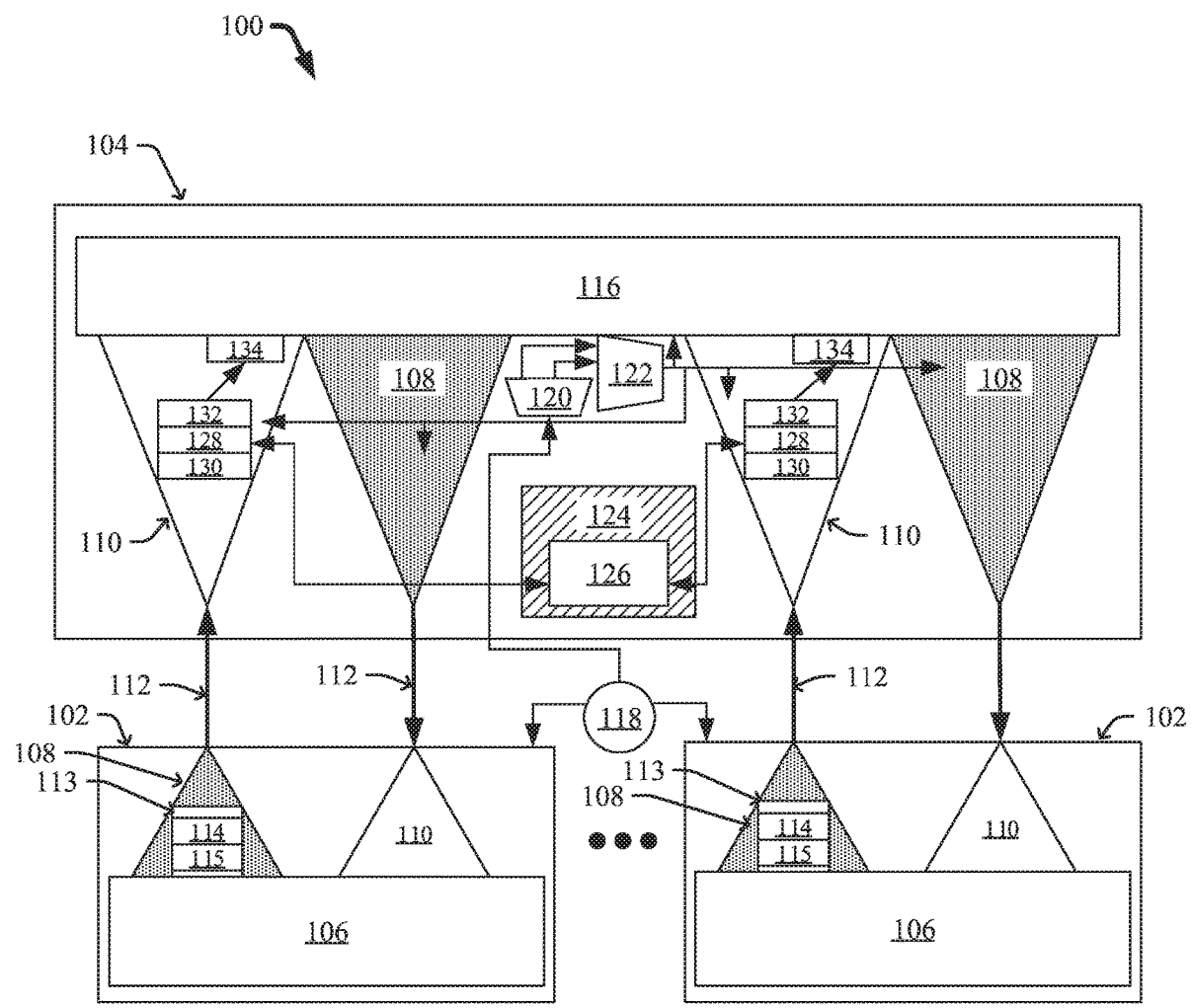
FIG. 1 illustrates a block diagram of an example, non-limiting quantum controller fast path interface that can route qubit information between one or more qubit controllers and/or conditional engines in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems with other implementations of qubit information routing; the present disclosure can be implemented to produce a solution to one or more of these problems via a trainable quantum controller fast path interface that can employ one or more continuous packet transfer protocols. Advantageously, one or more embodiments described herein can regard a quantum controller fast path interface that can be trained to exhibit data transfer characteristics akin to a direct register-to-register transfer. Further, the interface can be implemented with one or more continuous packet transfer approaches. Thereby, qubit data can be routed between registries without employing overhead bits that are traditionally used to identify the start and end of data packets. Further, the interface can identify the data sender information without traditional overhead bits based on bit position within the data packet.

Various embodiments of the present invention can be directed to computer processing systems, computer-implemented methods, apparatus and/or computer program products that facilitate the efficient, effective, and autonomous (e.g., without direct human guidance) qubit information routing. For example, one or more embodiments described herein can regard a quantum controller fast path interface the can route qubit information between one or more quantum controllers (e.g., lowest level quantum controllers) and conditional engines. The one or more quantum controllers can stimulate one or more qubits, and the conditional engines can perform one or more Boolean operation on the one or more qubits and route results back to the endpoints. In various embodiments, the interface can be implemented with a continuous packet transfer approach, where data packets containing only qubit data positions and qubit valids can be continuously transferred between the controllers and conditional engine. Further, the boundaries of the data packets can be established via one or more training algorithms embedded within the interface.

The computer processing systems, computer-implemented methods, apparatus and/or computer program products employ hardware and/or conditional software to solve problems that are highly technical in nature (e.g., qubit information routing), that are not abstract and cannot be performed as a set of mental acts by a human. Also, one or more embodiments described herein can constitute a technical improvement over conventional qubit information routing via a quantum controller fast path interface that employs embedded training algorithms to define the boundaries of data packets. Additionally, various embodiments described herein can demonstrate a technical improvement over conventional qubit information routing via a quantum controller fast path interface that employs continuous packet transfer protocols to transfer data between registries without the inclusion of overhead bits to qualify the qubit data.

Further, one or more embodiments described herein can have a practical application by establishing an interface between quantum controllers and conditional engines that can be characterized by a register-to-register transfer pattern. For instance, various embodiments described herein can employ embedded training algorithms to define data packet boundaries for implementation in a continuous packet transfer protocol that can identify data sender information based on bit position within the data packets. One or more embodiments described herein can control one or more delay routines within one or more receiving chips based on mesochronous clock domain stability. Thereby, the one or more embodiments can center data bits from the edges of stable clock domains to place the data bits outside the setup-and-hold window of the receiving clock. For instance, various embodiments described herein can control the delay routines of the interface to align data patterns across wires and/or maximize timing margins to minimize the risk of data slips that can be caused by device variations and/or temperature changes.

FIG. 1 illustrates a block diagram of an example, non-limiting interface 100 that can route qubit information between one or more quantum controller architectural blocks 102 and conditional engine architectural blocks 104. Repetitive description of like elements employed in other embodiments described herein is omitted for sake of brevity. Aspects of systems (e.g., interface 100 and the like), apparatuses or processes in various embodiments of the present invention can constitute one or more machine-executable components embodied within one or more machines (e.g., embodied in one or more computer readable mediums (or media) associated with one or more machines). Such components, when executed by the one or more machines (e.g., computers, computing devices, virtual machines, etc.) can cause the machines to perform the operations described.

The one or more quantum controller architectural blocks 102 can comprise one or more quantum controllers 106 operably coupled to one or more transmit chips 108 and receive chips 110. In various embodiments, the one or more quantum controllers 106 can be operably coupled to one or more qubits. Exemplary qubit technologies can include, but are not limited to, trapped ion qubits and/or superconducting qubits. For instance, wherein the qubits are trapped ion qubits, a plurality of ions can serve as qubits and one or more traps that serve to hold the ions in specific locations. Further, a laser or microwave source directed at one or more of the ions to affect the ion's quantum state, a laser to cool and/or enable measurement of the ions, and/or one or more photon detectors to measure the state of the ions. In another instance, superconducting qubits (e.g., such as superconducting quantum interference devices "SQUIDs") can be lithographically defined electronic circuits that can be cooled to milli-Kelvin temperatures to exhibit quantized energy levels (e.g., due to quantized states of electronic charge or magnetic flux). Superconducting qubits can be Josephson junction-based, such as transmon qubits and/or the like. Also, superconducting qubits can be compatible with microwave control electronics, and can be utilized with gate-based technology or integrated cryogenic controls. Additional exemplary qubit technologies can include, but are not limited to: photonic qubits, quantum dot qubits, gate-based neutral atom qubits, semiconductor qubits (e.g., optically gated or electrically gated), topological qubits, a combination thereof, and/or the like. As described herein the term "superconducting" can characterize a material that exhibits superconducting properties at or below a superconducting critical temperature, such as aluminum (e.g., superconducting critical temperature of 1.2 Kelvin) or niobium (e.g., superconducting critical temperature of 9.3 Kelvin). Additionally, one of ordinary skill in the art will recognize that other superconductor materials (e.g., hydride superconductors, such as lithium/magnesium hydride alloys) can be used in the various embodiments described herein.

The one or more quantum controllers 106 can stimulate the one or more qubits and/or output results from the stimulation. In various embodiments, the one or more quantum controllers 106 can transmit qubit data resulting from stimulation of the one or more qubits to the conditional engine architectural block 104. For example, the one or more quantum controllers 106 can transmit the qubit data via the one or more transmit chips 108. The one or more transmit chips 108 of the one or more quantum controller architectural blocks 102 can be operably coupled to one or more receive chips 110 of the conditional engine architectural block 104. For instance, the one or more transmit chips 108 of the one or more quantum controller architectural blocks 102 can be operably coupled to one or more receive chips 110 of the conditional engine architectural block 104 via one or more transmission wire buses 112. Further, the one or more transmit chips 108 can include fast path transmit logic circuitry layer 113 that can direct one or more continuous packet transfer protocols employed to direct qubit data from the one or more quantum controllers 106 to the conditional engine architectural block 104.

Additionally, the one or more quantum controllers 106 can stimulate the one or more qubits in accordance with one or more commands received via the one or more receive chips 110. In various embodiment, the one or commands can be generated by the conditional engine architectural block 104. As shown in FIG. 1, one or more receive chips 110 of the one or more quantum controller architectural block 102 can be operably coupled to one or more transmit chips 108 of the conditional engine architectural block 104. For instance, one or more receive chips 110 of the one or more quantum controller architectural block 102 can be operably coupled to one or more transmit chips 108 of the conditional engine architectural block 104 via one or more transmission wire buses 112.

The conditional engine architectural block 104 can comprise one or more conditional engines 116 operably coupled to one or more transmit chips 108 and/or receive chips 110. As shown in FIG. 1, the conditional engine architectural block 104 can be operably coupled to a plurality of quantum controller architectural blocks 102 via the interface 100. Although two quantum controller architectural blocks 102 are shown in FIG. 1, the architecture of the interface 100 is not so limited, and embodiments comprising greater than two quantum controller architectural blocks 102 are also envisaged. In various embodiments, the conditional engines 116 can generate one or more commands directing operation of the one or more quantum controllers 106 based on received qubit data. For example, the one or more conditional engines 116 can perform one or more Boolean operations and/or transformations based on the qubit data transmitted by the one or more quantum controller architectural blocks 102 and received via one or more receive chips 110 of the conditional engine architectural block 104. For instance, the one or more conditional engines 116 can control one or more conditional operations between quantum controllers 106 to execute various applications, such as forcing qubits to known states and/or qubit teleportation.

Additionally, the interface 100 can include a common clock source generated from an oscillator reference 118. As shown in FIG. 1, the common oscillator reference 118 can be operably coupled to both the one or more quantum controller architectural blocks 102 and conditional engine architectural blocks 104. For example, the transmit clocks and the receive clocks for the transmit chips 108 and receive chips 110 of the interface 100 can be derived from the common clock of the oscillator reference 118. In various embodiments, the common clock can go through a phase locked loop network 120 to generate a plurality of clocks that are selectable via a glitchless clock multiplexer 122. The glitchless clock multiplexer 122 can derive the clock signals for the one or more conditional engines 116, transmit chips 108, and/or receive chips 110 of the conditional engine architectural block 104.

The conditional engine architectural block 104 can further include one or more embedded processors 124 that can employ one or more training components 126 to execute one or more algorithms for training the interface 100. The one or more embedded processors 124 and/or training component 126 can be operably coupled to one or more programmable registers 128 comprised within the receive chips 110 of the conditional engine architectural block 104. The one or more programmable registers 128 can control one or more delay elements 130 positioned along one or more data paths established by the interface 100. Example delay elements 130 can include, but are not limited to: variable digital delay elements, a serial chain of digital buffers (e.g., with the stages of the serial chain being coupled to a multiplexer), analog circuitry, a combination thereof, and/or the like. Further, the one or more receive chips 110 of the conditional engine architectural block 104 can include one or more receive logic circuitry layers 132 that can send qubit data values to a programmable crossbar multiplexer 134.

In various embodiments, qubit data can be broadcasted from the one or more quantum controllers 106 and taken into the fast path transmit logic circuitry layer 113 of a transmit chip 108 of the quantum controller architectural block 102. As described further herein, the transmit logic circuitry layer 113 can include one or more free-running data pointers 114 and/or mask fields 115. In various embodiments, the one or more free-running data pointers 114 can select which qubit data and qubit valid pairs to transmit onto the one or more transmission wire buses 112 each clock cycle. Also, in various embodiments the one or more mask fields 115 can set and/or clear valid bits in data packets, where the bits can be set when received on the corresponding channel of the quantum controller 106 and cleared when the routing scheme rotation activates a routing scheme that assigns one or more wires to the given qubit data. The qubit data can further be multiplexed onto a configurable number of wires in a transmission wire bus 112. The transmission wire bus 112 can include wires bundled with a start-of-packet pulse for coordination with the receive logic circuitry layer 132 of the corresponding receive chip 110 and a parity signal wire to protect the qubit data signals, qubit valid signals, and/or the start-of-packet signal.

The receive logic circuitry layer 132 of the receive chip 110 of the conditional engine architectural block 104 can send the qubit data to a programmable crossbar multiplexer 134 where the data can be mapped to a receive buffer of the conditional engine 116. In various embodiments, the receive logic circuitry layer 132 can also include one or more free-running data pointers 114. Respective receive chips 110 can be paired with respective transmit chips 108 such that the one or more free-running data pointers 114 of the receive logic circuitry layer 132 can be synchronized to the free-running data pointers 114 of the paired transmit logic circuitry layer 113. The synchronization can be achieved via one or more training algorithms and/or computer-implemented methods executed by the training component 126 and described further herein. The receive logic circuitry layer 132 can have the same understanding of the number of wires in the transmission wire bus 112 and the number of qubits of the quantum controller 106 coupled to the paired transmit chip 108.

In various embodiments, the data signal's routing can be matched external to the field-programmable gate array ("FPGA") devices to produce minimal skew. The transmit chips 108 and/or receive chips 110 that directly drive and/or receive the transmission wire buses 112 can also be constrained into special I/O buffer registers to minimize internal data skew on the interface 100. Timing constraints can be employed to attempt to minimize clock skew to these same registers.

As shown in FIG. 1, the transmit and receive clocks of the transmit chips 108 and receive chips 110 can both be derived from the common oscillator reference 118 and go through the PLL network 120 to generate multiple clocks that are selectable via the glitchless clock multiplexer 122. The selected clocks on the transmit chips 108 and receive chips 110 can be matched in frequency, provided the same frequencies are selected via the register selection bits. As the clocks can be matched in frequency but not transmitted with the qubit data, the interface 100 can be a mesochronous clocking interface between the immediate transmit chip 108 and receive chip 110 driving and receiving the transmission wire buses 112.

Even though the skew of the transmission wire buses 112 can be matched at all stages including the driving and receiving registers, the delay elements 130 can be introduced into the data path along with the programmable register 128; thereby enabling the training component 126 to train the data paths such that qubit data bits are centered from the edges of the mesochronous clock domain and outside the setup-and-hold window of the receiving clock. Further, the training component 126 can ensure that the data patterns of the qubit data bits are aligned with the other wires of the transmission wire bus 112. In various embodiments, the training component 126 can select delay values regarding the delay elements 130 in order to maximize timing margins and minimize risks of future bit slips that can be caused by discrepancies due to part variation or temperature changes.

FIGS. 2-6 illustrates block diagrams of the example, non-limiting training component 126 that can execute one or more training algorithms to render the data transfer pattern of the interface to appear as a direct register-to-register transfer in accordance with various embodiments described herein. Repetitive description of like elements employed in other embodiments described herein is omitted for sake of brevity. In various embodiments, the training component 126 can train the interface 100 prior to one or more qubit data transfers between the one or more quantum controllers 106 and conditional engines 116. For example, the training component 126 can interact with the programmable register 128 to observe wire data and/or shift the one or more delay elements 130.

Figure 2:
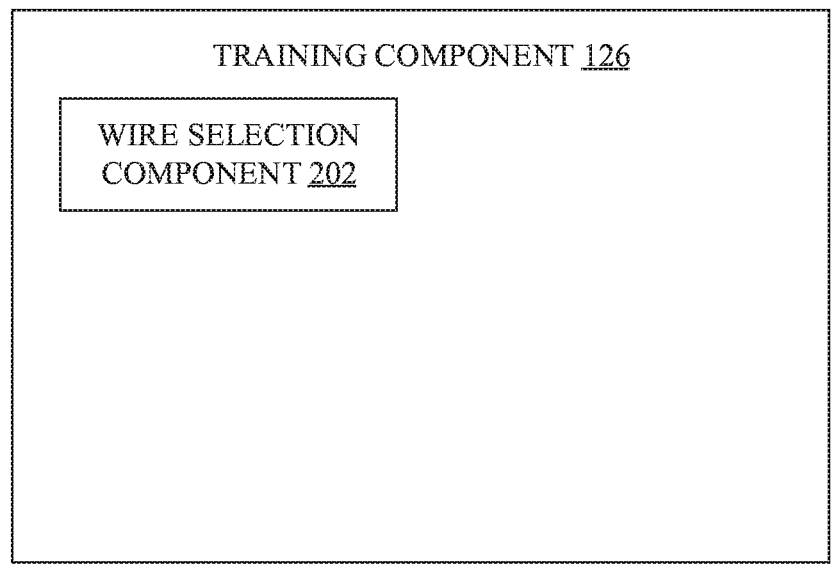
FIG. 2 illustrates a block diagram of an example, non-limiting training component that can train the quantum controller fast path interface in accordance with one or more embodiments described herein.

As shown in FIG. 2, the training component 126 can include wire selection component 202. In various embodiments, the wire selection component 202 can select an initial wire of the transmission wire bus 112 targeted for training. The data path associated with the selected wire can be controlled by the training component 126 via manipulation of the one or more delay elements 130. For example, the training component 126 can identify delay values to be executed by the programmable register 128 that controls the delay elements 130. The training component 126 can analyze each of the various delay routines available to the selected wire by varying the delay values associated with the delay elements 130 (e.g., each delay routine can be associated with a respected delay value). In various embodiments, the wire selection component 202 can also designate a wire of each transmission wire bus 112 as a reference wire. For example, the first wire of the transmission wire bus 112 selected by the wire selection component 202 can be regarded as the reference wire when training the target transmission wire bus 112.

Figure 3:
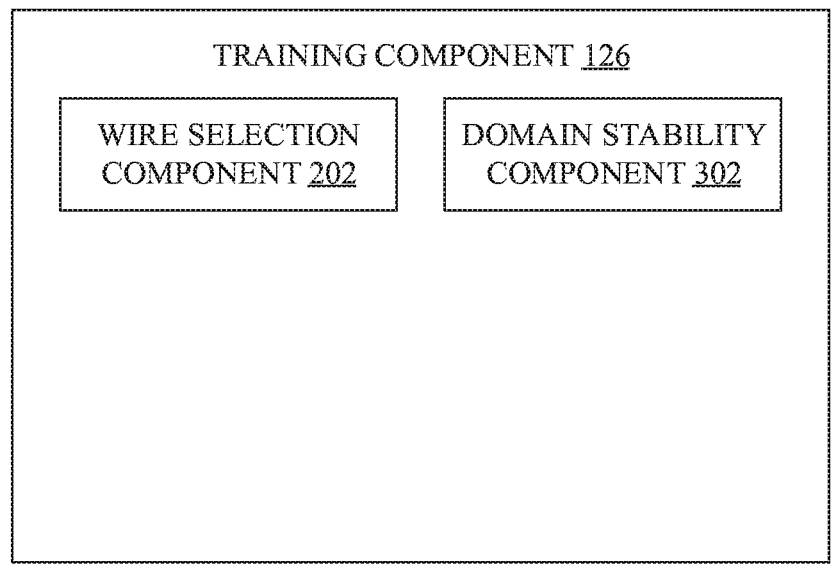
FIG. 3 illustrates a block diagram of an example, non-limiting training component that can assess the clock domain stability associated with a given delay routine of the quantum controller fast path interface in accordance with one or more embodiments described herein.

As shown in FIG. 3, the training component 126 can further include domain stability component 302. In various embodiments, the domain stability component 302 can assess the mesochronous clock domain stability of the selected wire at the current delay routine for the data path. In one or more embodiments, the domain stability component 302 can determine whether the transfer pattern associated with the current delay routine shows as a stable, single register-to-register stage between the respective transmit chip 108 and receive chip 110. For example, the domain stability component 302 can analyze the string of qubit data bits sent by the transmit chip 108 to identify one or more patterns. Further, a string pattern that characterizes a stable, single register-to-register stage can be predefined by the domain stability component 302. Where the string of qubit data bits received by the receive chip 110 matches the predefined pattern, the domain stability component 302 can determine that the mesochronous clock domain stability associated with the current delay value for the delay elements 130 is a stable, single register-transfer level ("RTL") stage. For instance, the programmable register 128 can be a shift registry, the predefined pattern can be a predefined stage of the shift registry, and the domain stability component 302 can determine whether the received qubit data string is in the predefined shift registry stage. If the current delay routine is not characterized by a stable, single register-to-register stage transfer pattern, the training component 126 can proceed to analyze other delay routines and/or wires of the transmission wire bus 112.

In various embodiments, the domain stability component 302 can analyze the observed data transfer pattern of the wire a plurality of times to determine whether the mesochronous clock domain stability is characterized by a stable single register-to-register stage pattern. For example, the domain stability component 302 can analyze the data transfer pattern hundreds of times by turning on and off the pattern from the transmit side. By repetitiously analyzing the data transfer pattern for the current delay routine, the domain stability component 302 can enhance the confidence of pattern determinations.

Figure 4:
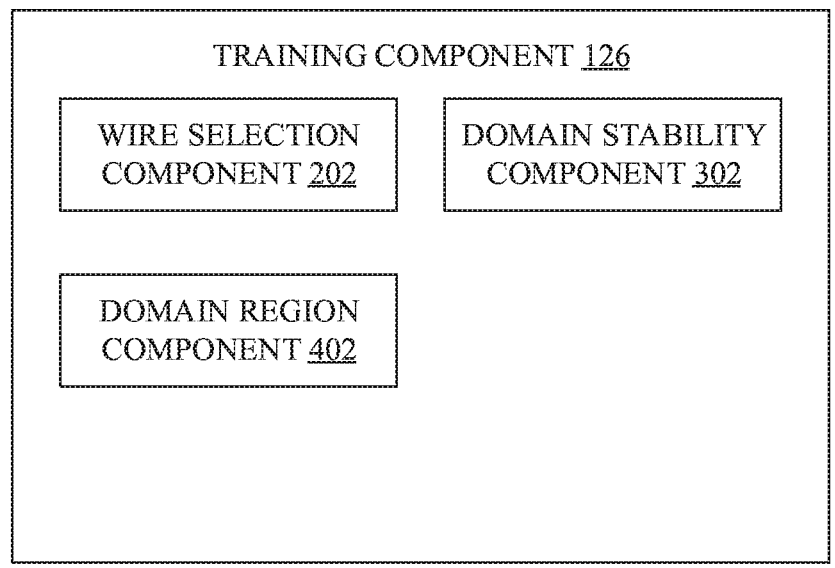
FIG. 4 illustrates a block diagram of an example, non-limiting training component that can track clock domain stability associated with delay routines of the quantum controller fast path interface in accordance with one or more embodiments described herein.

As shown in FIG. 4, the training component 126 can also include domain region component 402. In various embodiments, the domain region component 402 can track the stable domain regions of the mesochronous clock. Where the domain stability component 302 determines that the delay routine currently being evaluated is a stable, single register-to-register stage, the domain region component 402 can next determine whether the selected wire is a reference wire or aligns with a reference wire. For example, where the selected wire is not a reference wire, the domain region component 402 can cross-reference qubit data of the selected wire with the qubit data of the reference wire to ensure that the selected wire and reference wire are in alignment. If the selected wire is not a reference wire nor aligned with a reference wire, the training component 126 can proceed to analyze other delay routines and/or wires of the transmission wire bus 112.

Where the selected wire is the reference wire, or where the selected wire is aligned with the reference wire, the domain region component 402 can further determine whether the delay routine achieves a known stable region of the mesochronous clock domain. If the selected wire and delay routine are in a known stable region, the domain region component 402 can increase the size of the respective region. For example, the domain region component 402 can increase the size of the region by a defined value (e.g., increase the size of the region by one). If the selected wire and delay routine are not in a known stable region, the domain region component 402 can track a new region of the mesochronous clock domain. In various embodiments the domain region component 402 can thereby track the domain stability associated with each delay routine (e.g., with each delay value) for the selected wire. For example, the domain region component 402 can generate a table of stable delay regions for the selected wire, where the boundaries of the stable regions can be determined by the presence of one or more non-stable delay values.

Figure 5:
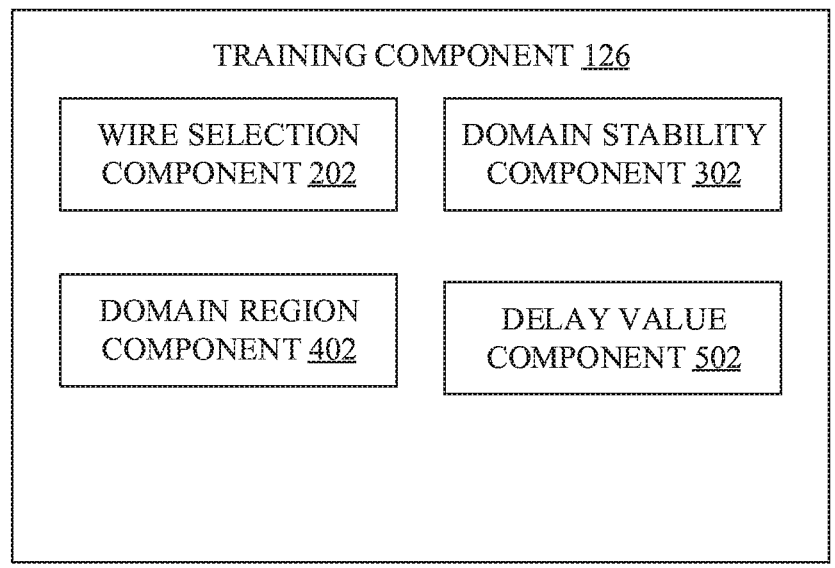
FIG. 5 illustrates a block diagram of an example, non-limiting training component that can control one or more delay values associated with delay routines of the quantum controller fast path interface in accordance with one or more embodiments described herein.

As shown in FIG. 5, the training component 126 can additionally include delay value component 502. In various embodiments, the delay value component 502 can determine whether there are any other delay routines for the selected wire that can be evaluated. For example, the delay value component 502 can determine whether there are any delay values for the delay elements 130 that have not yet been evaluated during the training of the selected wire. If there are available delay routines that have yet to be evaluated for the selected wire, the delay value component 502 can increase the current delay value to establish an alternate delay routine that can be further evaluated by the domain stability component 302 and/or domain region component 402 in accordance with the features described above.

Figure 6:
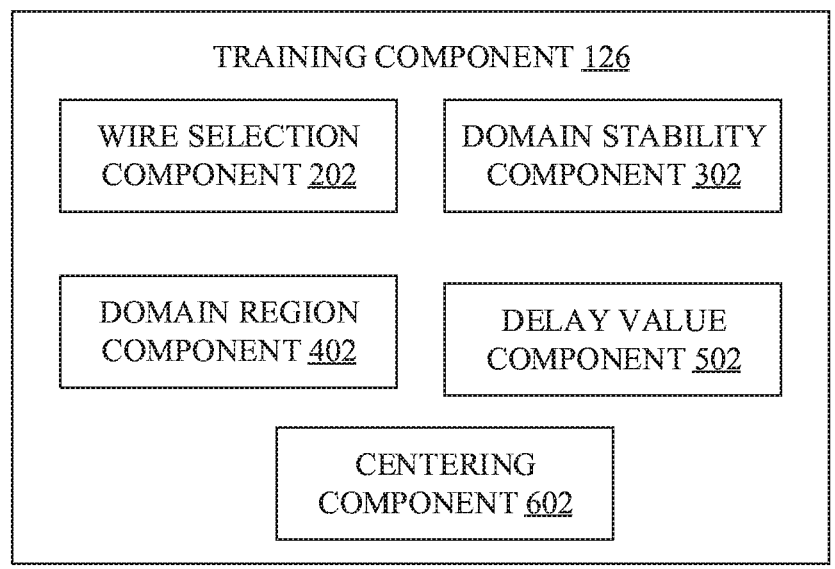
FIG. 6 illustrates a block diagram of an example, non-limiting training component that can assess the clock domain stability associated with a given delay routine of the quantum controller fast path interface in accordance with one or more embodiments described herein.

As shown in FIG. 6, the training component 126 can further include centering component 602. In various embodiments, the centering component 602 can select the delay value, and thereby the delay routine, that places the selected wire within the largest stable region of the mesochronous clock domain. For example, once all the available delay routines for the selected wire have been evaluated, the centering component 602 can select a delay value that achieves the largest stable region. Further, the centering component 602 can center the selected wire within the active clock edges of the region such that the qubit data bits are outside the restrictive time window. For example, the centering component 602 can center the selected wire from the edges of the largest stable clock region such that the qubit data bits are outside of the setup-and-hold time window. Further, the training component 126 can repeat the features and/or operations described above with each wire of the target transmission wire bus 112.

Figure 7:
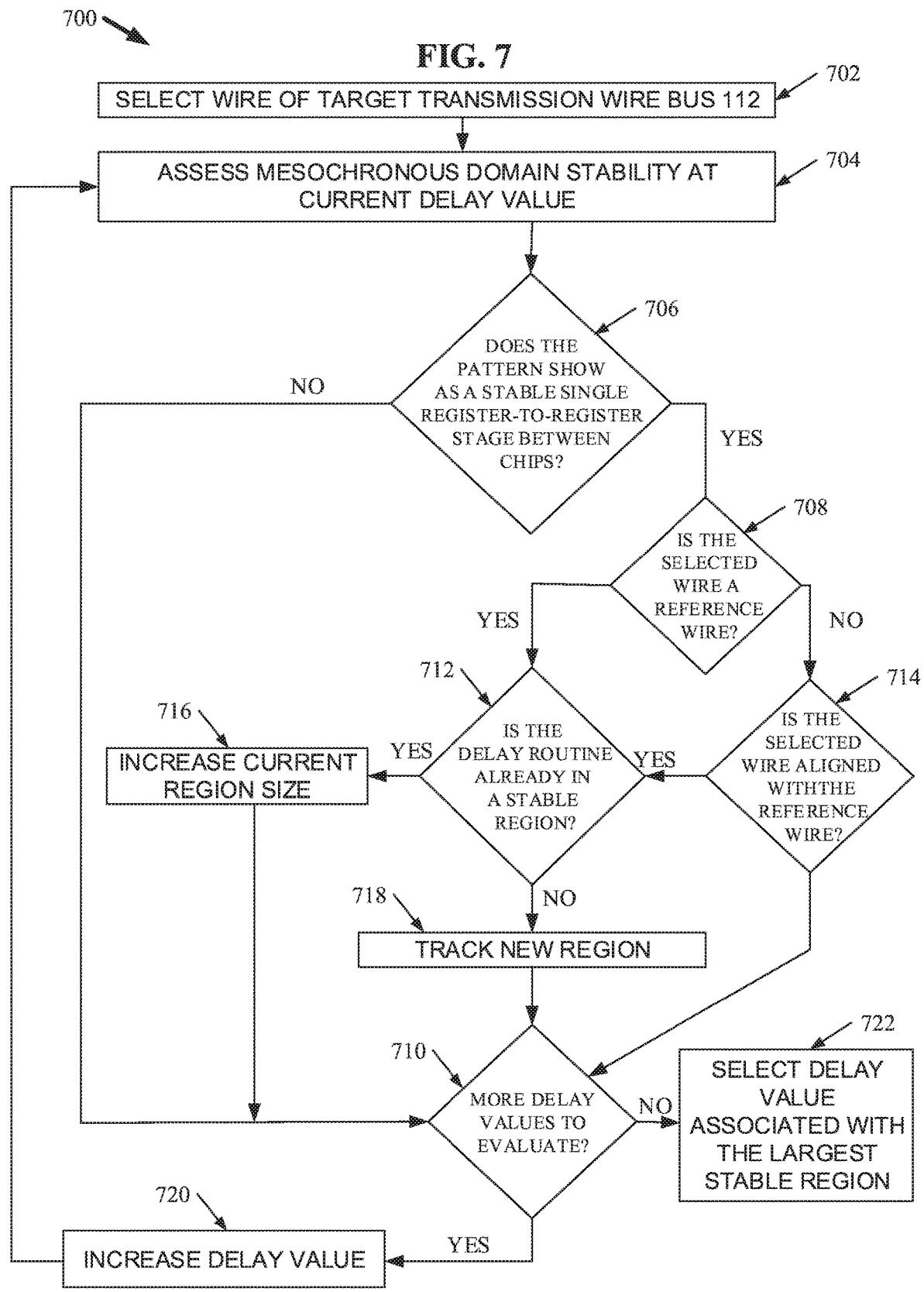
FIG. 7 illustrates a flow diagram of an example, non-limiting computer-implemented method that can be employed to train a quantum controller fast path interface in accordance with one or more embodiments described herein.

FIG. 7 illustrates a flow diagram of an example, non-limiting training algorithm 700 that can be executed by the training component 126 in accordance with one or more embodiments described herein. Repetitive description of like elements employed in other embodiments described herein is omitted for sake of brevity. The various steps of training algorithm 700 can be executed by the training component 126 and associate components of the training component 126 in accordance with the features and/or operations described herein.

At 702, the training algorithm 700 can comprise selecting (e.g., via wire selection component 202), a wire of a transmission wire bus 702 targeted for training. At 704, the training algorithm 700 can comprise assessing the mesochronous domain stability at the delay value currently being evaluated. For example, the training component 126 can observe the qubit data being transferred over the selected wire with the current delay value. The delay value can regard the one or more delay elements 130 positioned along the data path and can be implemented by the programmable register 128 at the direction of the training component 126.

At 706, the training algorithm 700 can comprise determining whether a transfer pattern of the selected wire with the current delay value shows as a stable single register-to-register stage between chips (e.g., between a transmit chip 108 of the quantum controller architectural block 102 and a receive chip 110 of the conditional engine architectural block 104). As described herein, in various embodiments the domain stability component 302 can determine whether the observed qubit data bit string is characterized by a defined pattern associated with a single RTL stage. If the observed pattern shows as a stable single register-to-register stage, the training algorithm 700 can proceed to step 708. If the observed pattern does not show as a stable single register-to-register stage, the training algorithm 700 can proceed to step 710.

At 708, the training algorithm 700 can comprise determining whether the selected wire is a reference wire. In various embodiments, the domain stability component 302 can designate a wire from the targeted transmission wire bus 112 as the reference wire. For example, the first wire of the targeted transmission wire bus 112 selected for training can be designated as the reference wire. If the selected wire is the reference wire, the training algorithm 700 can proceed to step 712. If the selected wire is not the reference wire, the training algorithm 700 can proceed to step 714.

At 714, the training algorithm 700 can comprise determining whether the selected wire is aligned with the reference wire. For example, the observed qubit data of the selected wire can be cross-referenced (e.g., via the domain region component 402) with a snapshot of qubit data transferred along the reference wire to determine whether the selected wire and the reference wire are aligned. If the selected wire and the reference wire are aligned, the training algorithm 700 can proceed to step 712. If the selected wire and the reference wire are not aligned, the training algorithm 700 can proceed to step 710.

At 712, the training algorithm 700 can comprise determining whether the delay routine is already in a stable region. For example, the domain region component 402 can track the stable regions associated with the selected wire via one or more region tracking tables of stable delay regions, where the boundaries of the stable regions can be determined by the presence of one or more non-stable delay values. If the delay routine is determined to be within an already known stable region, the training algorithm 700 can proceed to step 716. If the delay routine is not within an already known stable region, the training algorithm 700 can proceed to step 718.

At 716, the training algorithm 700 can comprise increasing the current region size. For example, the domain region component 402 can increase the size of the already known stable region by a defined value (e.g., by a value of one). At 718, the training algorithm 700 can comprise tracking a new stable region. For example, the domain region component 402 can update the region tracking table associated with the selected wire to reflect the region size increase and/or the presence of a new stable region. The training algorithm 700 can proceed from step 716 or step 718 to step 710.

At 710, the training algorithm 700 can comprise determining whether there are more delay values to evaluate for the selected wire. For example, the delay value component 502 can ascertain whether all the available delay values for the delay elements 130 have been evaluated by the training component 126 with regards to the selected wire. For instance, the delay value component 502 can reference the table constructed by the domain region component 402 to ascertain the delay values that have been previously evaluated and compare these delay values to a list of delay values available for execution by the programmable register 128 with regards to the delay elements 130. If there are additional delay values to evaluate, the training algorithm 700 can proceed to step 720. If there are no additional delay values available to evaluate, the training algorithm 700 can proceed to step 722.

At 720, the training algorithm 700 can comprise increasing the delay value. For example, the delay value component 502 can increase the delay value by a defined value to a delay value that has not yet been evaluated by the training component 126 with regards to the selected wire. As shown in FIG. 7, once the delay value is increased to the new delay value, the training algorithm 700 can repeat steps 706-718 to evaluate the transfer pattern and/or domain stability associated with the new delay value. At 722, the training algorithm 700 can comprise selecting a delay value associated with the largest stable region. For example, the centering component 602 can consult the region tracking table constructed by the domain region component 402 to identify the largest region associated with the evaluated delay values. In various embodiments, the training algorithm 700 can further comprise at 722 centering the qubit data bits of the selected wire and delay routine within the receiving clock domain from the active clock edges. For example, the qubit data bits can be centered from the rising edge and the falling edge of the largest region. Thereby, the qubit data bits can be positioned outside the setup-and-hold time window at each edge. For instance, if the largest region has a size of 300 and boundaries defined by a minimum delay value of 100 and maximum delay value of 400, the centering component 602 can select delay value 250 for the selected wire.

In one or more embodiments, the training algorithm 700 can be repeated for each wire of the target transmission wire bus 112 and/or for each transmission wire bus 112 of the interface 100. For example, the embedded training component 126 can execute steps 702-722 with regards to each wire of the one or more transmission wire buses 112 to train the interface 100.

Figure 8:
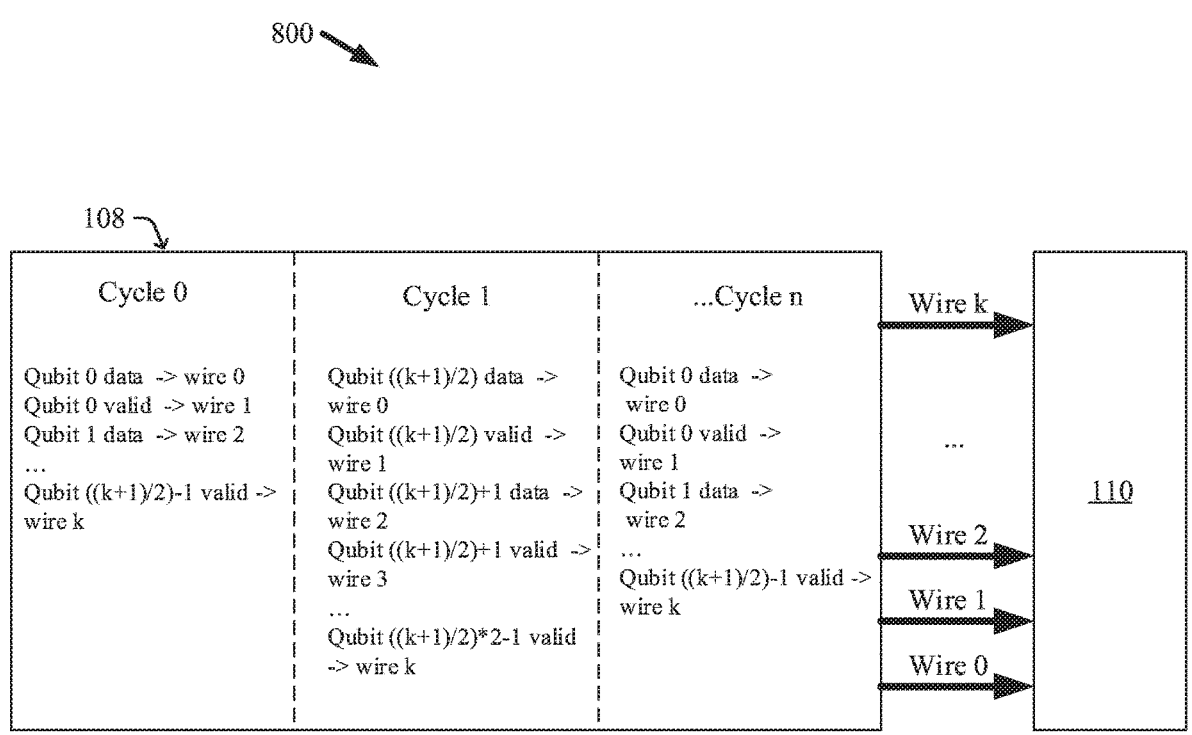
FIG. 8 illustrates a block diagram of an example, non-limiting paternoster hardware protocol that can be employed by the quantum controller fast path interface in accordance with one or more embodiments described herein.

FIG. 8 illustrates a diagram of an example, non-limiting continuous packet transfer protocol 800 that can be employed by the interface 100 in accordance with one or more embodiments described herein. Repetitive description of like elements employed in other embodiments described herein is omitted for sake of brevity. In various embodiments, the interface 100 can employ the example continuous packet transfer protocol 800 subsequent to the training performed by the embedded training component 126. As shown in FIG. 8, in accordance with the continuous packet transfer protocol 800 data packets containing only qubit data positions and qubit valids can be continuously transferred between the one or more transmit chips 108 of the quantum controller architectural blocks 102 and the receive chips 110 of the conditional engine architectural blocks 104. The boundaries of the data packets can be established during the training performed by the training component 126 (e.g., established during the training performed in accordance with training algorithm 700). As qubit data becomes available, the continuous packet transfer protocol 800 can hold the data until the next data packet arrives, insert the new bit of qubit data (e.g., a new qubit measurement value) along with a qubit valid, and then transmit the packet to the receive chip 110. Thereby, overhead bits are not required to identify the start and end of the data packets, and the sender information can be inferred from the bit position within the data packet. Advantageously, the continuous packet transfer protocol 800 can enable data transfer during runtime of the interface 100 to be executed with low latency so as to overcome qubit degradation occurring during the transfer.

In one or more embodiments, the continuous packet transfer protocol can be implemented by the transmit logic circuitry layer 113 of a transmit chip 108 of a quantum controller architectural block 102 in conjunction with the receive logic circuitry layer 132 of a receive chip 110 of a conditional engine architectural block 104. Further, the transmission wire bus 112 between chips can include "k" number of wires (e.g., wire 0, wire 1, wire 2, to wire "k", as shown in FIG. 8), where the total number wires is a positive even integer. The transmit logic circuitry layer 113 can route through a plurality of routing schemes that direct wire assignments through a mask of what qubit numbers are sent out in the current cycle via a free running pointer. Additionally, the transmit logic circuitry layer 113 can set send qubit valid vectors based on receipts from the associate quantum controller 106 acquire channels. Further, the send qubit valid vectors can be cleared upon transmission to the conditional engine architectural block 104. The receive logic circuitry layer 132 can have the same understanding of the rotation of routing schemes as the transmit logic circuitry layer 113. Further, the receive logic circuitry layer 132 can handle current incoming qubit data and valid pairs on the wire of the transmission wire bus 112 for each cycle and forward the pairs to the conditional engine 116 according to conditional assigned mappings.

As shown in FIG. 8, the continuous packet transfer protocol 800 can comprise a plurality of cycles (e.g., "x" number of cycles up to and including cycle "n"). With each cycle, the continuous packet transfer protocol 800 can employ a different routing scheme to assign the wire utilized to transmit a qubit data and valid pair. The number of cycles can be configured based on the number of qubit data and valid pairs broadcast from the quantum controller 106. So long as the transmit logic circuitry layer 113 and the receive logic circuitry layer 132 are both set to the same rotation of routing schemes and cycle count, qubit qualifying information can be inferred based on the wire employed to transfer the data, the current cycle count, and/or the qubit data bit position within the data package.

Where the quantum controller 106 controls a number of qubits "q", and the number of wires "i" of the transmission wire bus 112 is greater than or equal to two times the number of qubits "q" (e.g., where 2×q≤i), the qubit data from respective qubits can be routed to the same wires (e.g., wire 0) each cycle (e.g., at least because there are enough wires for each qubit data and qubit valid coming from the quantum controller 106). However, where the number of wires "i" is less than two times the number of qubits "q" (e.g., where 2×q>i), the transmit logic circuitry layer 113 and the receive logic circuitry layer 132 can rotate through multiple routing schemes so as to alternate wire assignments with each cycle and thereby transmit all the available qubit data and valid pairs without qualifying overhead information and/or without strictly dedicated wires.

For example, an array "a" containing the packet data can be defined in accordance Equation 1 below:

$$a[j]_{j=[0:2*q-1]} = \begin{cases} qubit_{j/2} \text{ Data, if } j \text{ is even} \\ qubit_{(j-1)/2} \text{ Valid, if } j \text{ is odd} \end{cases} \quad (1)$$

For instance: a[0] can contain qubit 0 data, a[1] can contain qubit 0 valid, a[2]=qubit 1 data, and so on. Further, assignment of a given wire "w" with index "k" to a data packet array "a" during a given clock cycle "x" can be characterized by Equation 2 below:

$$w_k = a[(i*x+k)\%(2*q)] \quad (2)$$

FIG. 8 depicts an exemplary routing scheme rotation that alters wire assignments with each clock cycle. For example, during cycle 0 of the continuous packet transfer protocol 800, qubit data from qubit 0 can be routed to wire 0, qubit valids from qubit 0 can be routed to wire 1, qubit data from qubit 1 can be routed to wire 2, and so on. For instance, cycle 0 can follow a routing scheme such that the qubit valid routed to wire "k" is from qubit ((k+1)/2)−1 (e.g., with regards to wire 1, "k" equals 1 and therefore the qubit valid from qubit 0 is routed to wire 1, as shown) and the qubit data from the same qubit is routed to the preceding wire in the index (e.g., qubit data from qubit 0 is routed to wire 0).

In the next cycle, the continuous packet transfer protocol 800 can rotate to a new routing scheme such that the wires have different qubit assignments. For example, during cycle 1 of the continuous packet transfer protocol 800, qubit data from qubit 1 can be routed to wire 0, qubit valids from qubit 1 can be routed to wire 1, qubit data from qubit 3 can be routed to wire 2, qubit valids from qubit 3 can be routed to wire 3, and so on. For instance, cycle 1 can follow a routing scheme such that the qubit valid routed to wire "k" is from qubit ((k+1)/2)*2−1 (e.g., with regards to wire 3, "k" equals 3 and therefore the qubit valid from qubit 3 is routed to wire 3) and the qubit data from the same qubit is routed to the preceding wire (e.g., qubit data from qubit 3 is routed to wire 2).

During example cycle 0, data packets for qubits 0 and 2 are available as the qubit data and valids for both qubits are assigned to wires (e.g., wires 0-1 and 4-5). However, during example cycle 1 data packets for qubits 0 and 2 are not available as the routing scheme employed during cycle 1 does not assign wires to the qubit data and valids for these qubits. Thus, as qubit data and valids become available from qubits 0 and 2, the qubit data and valid pairings can be forced by the transmit logic circuitry layer 113 to wait for a cycle that employs a routing scheme with an available data packet for the qubit data and valid pairings of qubits 0 and/or 2. For example, the available qubit data and valid pairings from qubits 0 and/or 2 can be forced to wait until example cycle 0, or another cycle with an available data packet, is active in the rotation of routing schemes.

As the continuous packet transfer protocol 800 rotates through the routing schemes, the rotation protocol can eventually loop back to the initial routing scheme and the continuous packet transfer protocol 800 can once again rotate through the routing schemes. For example, FIG. 8 illustrates that the routing scheme for example cycle "n" is the same as the initial rotating scheme for example cycle 0; thereby illustrating that at cycle "n" the continuous packet transfer protocol 800 can begin repeating the rotation protocol. For instance, the routing scheme for example cycle "n+1" can be the same as the routing scheme example cycle 1.

Figure 9:
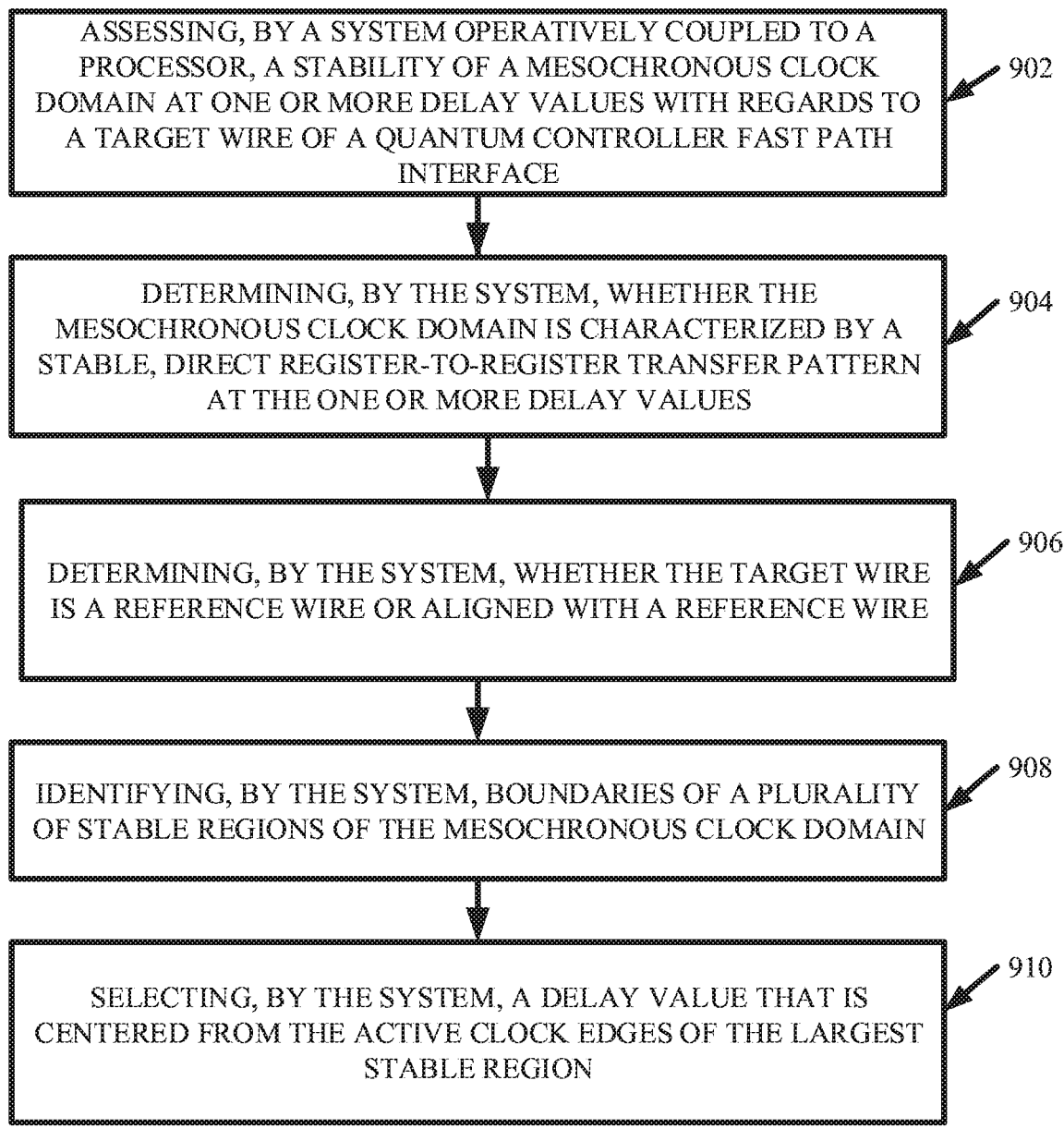
FIG. 9 illustrates a flow diagram of an example, non-limiting computer-implemented method that can be employed to train a quantum controller fast path interface in accordance with one or more embodiments described herein.

FIG. 9 illustrates a flow diagram of an example, non-limiting computer-implemented method 900 that can be employed to train the interface 100 in accordance with one or more embodiments described herein. Repetitive description of like elements employed in other embodiments described herein is omitted for sake of brevity. In various embodiments, computer-implemented method 900 can be employed by the training component 126 via execution of the training algorithm 700.

At 902, the computer-implemented method 900 can comprise assessing (e.g., via domain stability component 302), by a system (e.g., interface 100) operatively coupled to a processor (e.g., embedded processor 124), a stability of a mesochronous clock domain at one or more delay values with regards to a target wire (e.g., comprised within transmission wire bus 112) of a quantum controller fast path interface (e.g., interface 100). At 904, the computer-implemented method 900 can comprise determining (e.g., via domain stability component 302), whether the mesochronous clock domain is characterized by a stable, direct register-to-register transfer pattern at the one or more delay values.

At 906, the computer-implemented method 900 can comprise determining (e.g., via domain region component 402), by the system (e.g., interface 100), whether the target wire is a reference wire or aligned with a reference wire. For example, the domain region component 402 can designate one or more wires of the transmission wire bus 112 as the reference wire. Further, where the target wire is not the reference wire, the domain region component 402 can determine whether the target wire is aligned with the reference wire. At 908, the computer-implemented method 900 can comprise identifying (e.g., via domain region component 402 and/or delay value component 502), by the system (e.g., interface 100), the boundaries of a plurality of stable regions of the mesochronous clock domain. For example, the domain region component 402 can track the various stable and non-stable regions associated with the evaluated delay values via a region tracking table in accordance with the various embodiments described herein. At 910, the computer-implemented method 900 can comprise selecting (e.g., via centering component 602), by the system (e.g., interface 100), a delay value that is centered from the active clock edges of the largest stable region.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone conditional package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 10:
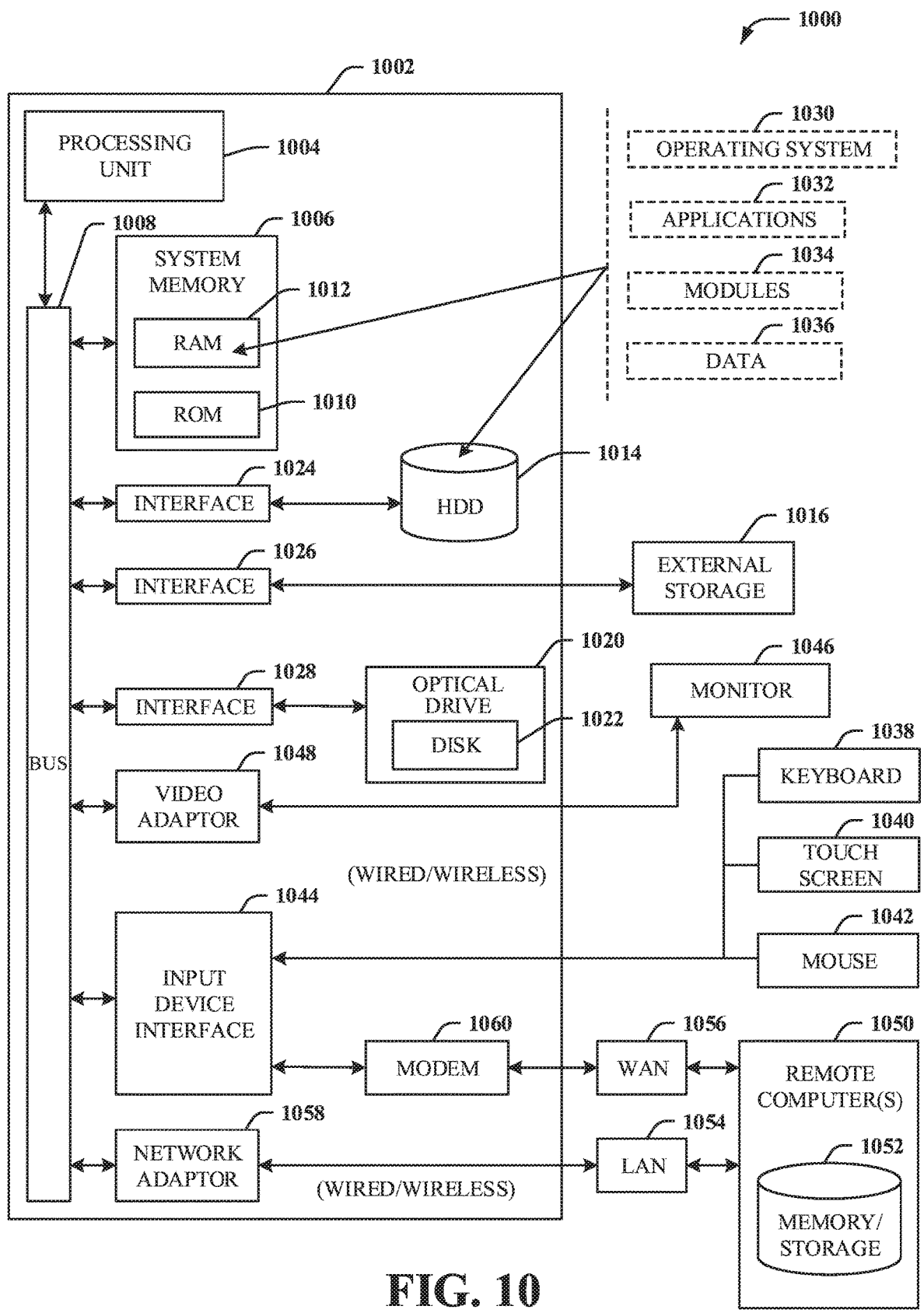
FIG. 10 illustrates a block diagram of an example, non-limiting operating environment in which one or more embodiments described herein can be facilitated.

In order to provide additional context for various embodiments described herein, FIG. 10 and the following discussion are intended to provide a general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and conditional.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things ("IoT") devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system ("BIOS") can be stored in a non-volatile memory such as ROM, erasable programmable read only memory ("EPROM"), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive ("HDD") 1014 (e.g., EIDE, SATA), one or more external storage devices 1016 (e.g., a magnetic floppy disk drive ("FDD") 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive ("SSD") could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus ("USB") and Institute of Electrical and Electronics Engineers ("IEEE") 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine ("VM") of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of conditional that include, e.g., code, runtime, system tools, system libraries and settings for an application.

Further, computer 1002 can be enable with a security module, such as a trusted processing module ("TPM"). For instance with a TPM, boot components hash next in time boot components, and wait for a match of results to secured values, before loading a next boot component. This process can take place at any layer in the code execution stack of computer 1002, e.g., applied at the application execution level or at the operating system ("OS") kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network ("LAN") 1054 and/or larger networks, e.g., a wide area network ("WAN") 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point ("AP") disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity ("Wi-Fi") and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   training, by a system operatively coupled to a processor, a quantum controller fast path interface for routing qubit data bits between a quantum controller and conditional engine by adjusting a delay value such that a mesochronous clock domain is characterized by a direct register-to-register transfer pattern.

2. The computer-implemented method of claim 1, further comprising:
   selecting, by the system, the delay value that stabilizes the mesochronous clock domain by shifting a delay device of the quantum controller fast path interface.

3. The computer-implemented method of claim 2, wherein the training centers the qubit data bits within the receiving clock domain from active clock edges.

4. The computer-implemented method of claim 3, wherein the training maximizes a time margin of the receiving clock domain.

5. The computer-implemented method of claim 1, further comprising:
   identifying, by the system, boundaries of a plurality of stable regions of the mesochronous clock domain by tracking a stability of the mesochronous clock domain at a plurality of delay values that the quantum fast path interface can implement with regards to a target wire.

6. The computer-implemented method of claim 5, the training further comprising:
   selecting, by the system, a preferred delay value from the plurality of delay values that is associated with a largest stable region from the plurality of stable regions; and
   employing, by the system, the preferred delay value with the target wire for routing the qubit data bits.

7. The computer-implemented method of claim 1, further comprising:
   assessing, by the system, a stability of the mesochronous clock domain at the delay value with regards to a target wire of the quantum controller fast path interface.

8. The computer-implemented method of claim 7, wherein the assessing comprises:
   determining, by the system, whether the target wire is a reference wire of the quantum controller fast path interface based on an assessment that the stability of the mesochronous clock domain is characterized by the direct register-to-register transfer pattern; and
   determining, by the system, whether the target wire aligns with the reference wire based on an assessment that the stability of the mesochronous clock domain is characterized by the direct register-to-register transfer pattern.

9. The computer-implemented method of claim 8, wherein the assessing further comprises:
   determining, by the system, whether the qubit data bits are in a stable region of the mesochronous clock domain based on a determination that the target wire is the reference wire or is aligned with the reference wire.

10. A computer program product for routing qubit data bits between a quantum controller and a conditional engine, the computer program product comprising a computer readable storage medium having program instructions embodied therewith, the program instructions executable by a processor to cause the processor to:
    train, by the processor, a quantum controller fast path interface by adjusting a delay value such that a mesochronous clock domain of the quantum controller fast path interface is characterized by a direct register-to-register transfer pattern.

11. The computer program product of claim 10, wherein the program instructions further cause the processor to:
    select, by the processor, a receiving clock domain that stabilizes the mesochronous clock domain by shifting a delay device of the quantum controller fast path interface.

12. The computer program product of claim 10, wherein the program instructions further cause the processor to:
    assess, by the processor, a stability of the mesochronous clock domain at the delay value with regards to a target wire of the quantum controller fast path interface.

13. The computer program product of claim 12, wherein the program instructions further cause the processor to:
    determine, by the processor, whether the target wire is a reference wire of the quantum controller fast path interface based on an assessment that the stability of the mesochronous clock domain is characterized by the direct register-to-register transfer pattern; and
    determine, by the processor, whether the target wire aligns with the reference wire based on an assessment that the stability of the mesochronous clock domain is characterized by the direct register-to-register transfer pattern.

14. The computer program product of claim 13, wherein the program instructions further cause the processor to:
    determine, by the processor, whether the qubit data bits are in a stable region of the mesochronous clock domain based on a determination that the target wire is the reference wire or is aligned with the reference wire; and
    increase, by the processor, a size of the stable region based on a determination that the qubit data bits are in the stable region.

15. The computer program product of claim 14, wherein the delay value is from a plurality of delay values to be assessed by the processor, wherein the assessing renders a plurality of stable regions associated with the plurality of delay values with regards to the target wire, and wherein the program instructions further cause the processor to:
    select, by the processor, a preferred delay value from the plurality of delay values associated with a largest stable region from the plurality of stable regions; and
    employ, by the processor, the preferred delay value with the target wire for routing the qubit data bits.

16. A system, comprising:
    a quantum controller fast path interface that routes a qubit data packet between a quantum controller and a conditional engine via a packet transfer protocol in which sender information is inferred from data position within the qubit data packet, wherein the quantum controller broadcasts qubit data to a transmit logic circuitry of the quantum controller fast path interface, and wherein the transmit logic circuitry is synchronized with receive logic circuitry operably coupled to the conditional engine.

17. The system of claim 16, wherein the transmit logic circuitry cycles through a plurality of routing schemes, and wherein the plurality of routing schemes assign the qubit data packet to a transmission wire from a plurality of transmission wires.

18. The system of claim 16, wherein the qubit data packet consists of a pairing of the data position and a qubit valid.

19. The system of claim 17, wherein the packet transfer protocol continuously transfers qubit data between the transmit logic circuitry and the receive logic circuitry while cycling through the plurality of routing schemes.

* * * * *